United States Patent
Chen et al.

(10) Patent No.: US 7,890,072 B2
(45) Date of Patent: Feb. 15, 2011

(54) WIRELESS COMMUNICATION APPARATUS FOR ESTIMATING(C/I) RATIO USING A VARIABLE BANDWIDTH FILTER

(75) Inventors: Shaojie Chen, Austin, TX (US); Guner Arslan, Austin, TX (US)

(73) Assignee: Silicon Laboratories, Inc., Austin, TX (US)

( * ) Notice: Subject to any disclaimer, the term of this patent is extended or adjusted under 35 U.S.C. 154(b) by 1176 days.

(21) Appl. No.: 11/528,073

(22) Filed: Sep. 27, 2006

(65) Prior Publication Data
US 2008/0076357 A1    Mar. 27, 2008

(51) Int. Cl.
  *H04B 17/00*  (2006.01)
(52) U.S. Cl. .................. 455/226.1; 455/226.2; 455/307
(58) Field of Classification Search .............. 455/226.1, 455/67.11–67.14, 63.1, 307
See application file for complete search history.

(56) References Cited

U.S. PATENT DOCUMENTS

| | | | |
|---|---|---|---|
| 6,456,673 B1 * | 9/2002 | Wiese et al. | 455/67.11 |
| 6,650,872 B1 * | 11/2003 | Karlsson | 455/67.11 |
| 6,832,195 B2 * | 12/2004 | Johnson | 704/270 |
| 7,035,347 B2 * | 4/2006 | Rao et al. | 375/316 |
| 7,155,246 B2 * | 12/2006 | Bhushan et al. | 455/509 |
| 7,646,802 B2 * | 1/2010 | Black et al. | 375/229 |
| 7,653,162 B2 * | 1/2010 | Hayashi et al. | 455/226.1 |
| 2004/0267519 A1 * | 12/2004 | Sjoberg et al. | 704/201 |
| 2005/0136959 A1 * | 6/2005 | Hellwig et al. | 455/522 |
| 2005/0159162 A1 * | 7/2005 | Park | 455/450 |
| 2008/0076466 A1 * | 3/2008 | Larsson | 455/522 |

* cited by examiner

*Primary Examiner*—Lana N Le
(74) *Attorney, Agent, or Firm*—Meyertons, Hood, Kivlin, Kowert & Goetzel, P.C.; Stephen J. Curran (57) ABSTRACT

A wireless communication apparatus includes a mechanism for estimating carrier-to-interference (C/I) ratio using a variable bandwidth filter. More particularly, the wireless communication apparatus includes a channel equalization unit coupled to a C/I ratio estimation unit. The channel equalization unit may be configured to calculate instantaneous carrier-to-interference (C/I) ratio values of a received signal. In addition, the C/I ratio estimation unit may be configured to calculate a C/I ratio estimate by filtering successive ones of the instantaneous C/I ratio values. The C/I ratio estimation unit may also be configured to determine whether a transmitter of the signal is transmitting voice data in a voice channel of the signal. The C/I ratio estimation unit may be further configured to inhibit the filtering in response to determining the transmitter of the signal is not transmitting the voice data such as during DTX mode, for example.

21 Claims, 5 Drawing Sheets

WIRELESS COMMUNICATION APPARATUS FOR ESTIMATING(C/I) RATIO USING A VARIABLE BANDWIDTH FILTER

BACKGROUND OF THE INVENTION

1. Field of the Invention

This invention relates to wireless communications and, more particularly, to estimating carrier-to-interference ratio.

2. Description of the Related Art

Wireless communication devices such as mobile telephones, for example, transmit and receive signals including speech audio. Thus, they typically include a voice or speech encoder/decoder or "vocoder." The vocoder may be used for compression/decompression of digital voice audio using audio compression algorithms. In addition, a channel encoder/decoder or channel codec may provide error protection of the received signal against channel imperfections by adding error detection/correction codes (EDC/ECC) in the transmitted signal. One type of vocoder uses a compression technology that is referred to as Adaptive Multi-Rate (AMR). In a system that supports AMR, the vocoder may dynamically adapt the audio compression bit rate dependent upon network channel conditions. More particularly, depending on the interference (and thus the signal quality) in the traffic channel, the vocoder bit rate may be increased or decreased to accommodate fewer or more EDC/ECC bits, for example.

A key attribute of such systems is the ability to rapidly adapt the rate using in-band signaling. One type of in-band signaling is referred to as codec mode request (CMR). CMR may be used by a mobile handset to request that the network use a specified downlink rate. The network may provide one or more signal quality thresholds to the mobile handset. The signal quality threshold values may correspond to carrier-to-interference (C/I) ratio values. During operation, the mobile handset may calculate C/I ratio estimates and compare them to the network-provided thresholds to determine which vocoder rate to request. Accordingly, the accuracy of the C/I ratio estimate affects the AMR performance. However, certain transmission modes such as discontinuous transmission (DTX) may prevent conventional C/I ratio estimation techniques from accurately estimating the C/I ratio.

SUMMARY

Various embodiments of a wireless communication apparatus including a mechanism for estimating carrier-to-interference (C/I) ratio using a variable bandwidth filter are disclosed. In one embodiment, the wireless communication apparatus includes a channel equalization unit coupled to a C/I ratio estimation unit. The channel equalization unit may be configured to calculate instantaneous carrier-to-interference (C/I) ratio values of a received signal. In addition, the C/I ratio estimation unit may be configured to calculate a C/I ratio estimate by filtering successive ones of the instantaneous C/I ratio values. The C/I ratio estimation unit may also be configured to determine whether a transmitter of the signal is transmitting voice data in a voice channel of the signal based upon information transmitted in the signal, for example. The C/I ratio estimation unit may be further configured to inhibit the filtering in response to determining the transmitter of the signal is not transmitting voice data such as during DTX mode, for example.

In one specific implementation, the C/I ratio estimation unit includes a detection unit that may be configured to detect the information. The information may include a plurality of bits corresponding to an identification marker that identifies a discontinuous transmission (DTX) mode.

In another specific implementation, the C/I ratio estimation unit also includes a variable bandwidth filter unit that may be configured to average the ones of successive instantaneous C/I ratio values to calculate the C/I ratio estimate. The bandwidth may be dependent upon a signal quality of the received signal.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. It is noted that the word "may" is used throughout this application in a permissive sense (i.e., having the potential to, being able to), not a mandatory sense (i.e., must).

DETAILED DESCRIPTION

Figure 1:
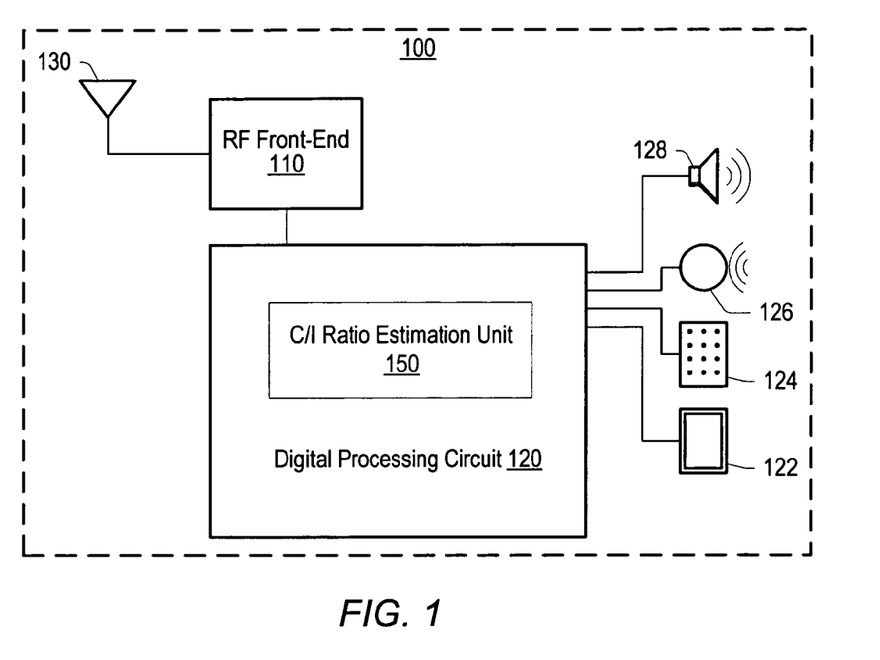
FIG. 1 is a generalized block diagram of one embodiment of a wireless communication apparatus.

Turning now to FIG. 1, a generalized block diagram of a wireless communication apparatus 100 is shown. Wireless communication apparatus 100 includes an RF front-end circuit 110 coupled to a digital processing circuit 120. As shown, various user interfaces including a display 122, a keypad 124, a microphone 126, and a speaker 128 may be coupled to digital processing circuit 120, depending upon the specific application of wireless communication apparatus 100 and its desired functionality. An antenna 130 is also shown coupled to RF front-end circuit 110. It is noted that in various embodiments, wireless communication apparatus 100 may include additional components and/or couplings not shown in FIG. 1 and/or exclude one or more of the illustrated components, depending on the desired functionality. It is further noted that components that include a reference number and letter may be referred to by the reference number alone where appropriate, for simplicity.

Wireless communication apparatus 100 is illustrative of various wireless devices including, for example, mobile and cellular phone handsets, machine-to-machine (M2M) communication networks (e.g., wireless communications for vending machines), so-called "911 phones" (a mobile handset configured for calling the 911 emergency response service), as well as devices employed in emerging applications such as third generation (3G), fourth generation (4G), satellite communications, and the like. As such, wireless communication apparatus 100 may provide RF reception functionality, RF transmission functionality, or both (i.e., RF transceiver functionality).

Wireless communication apparatus 100 may be configured to implement one or more specific communication protocols or standards, as desired. For example, in various embodiments wireless communication apparatus 100 may employ a time-division multiple access (TDMA), a code division multiple access (CDMA) and/or a wideband CDMA (WCDMA) technique to implement standards such as the Global System for Mobile Communications (GSM) standard, the Personal Communications Service (PCS) standard, and the Digital Cellular System (DCS) standard, for example. In addition, many data transfer standards that work cooperatively with the various technology platforms may also be supported. For example, wireless communication apparatus 100 may also implement the General Packet Radio Service (GPRS) standard, the Enhanced Data for GSM Evolution (EDGE) standard, which may include Enhanced General Packet Radio Service standard (E-GPRS) and Enhanced Circuit Switched Data (ESCD), the high speed circuit switched data (HSCSD) standard, high speed downlink packet access (HSDPA), high speed uplink packet access (HSUPA), and evolution data optimized (EV-DO), among others.

RF front-end circuit 110 may accordingly include circuitry to provide RF reception capability and/or RF transmission capability. In one embodiment, front-end circuit 110 may down-convert a received RF signal to baseband and/or up-convert a baseband signal for RF transmission. RF front-end circuit 110 may employ any of a variety of architectures and circuit configurations, such as, for example, low-IF receiver circuitry, direct-conversion receiver circuitry, direct up-conversion transmitter circuitry, and/or offset-phase locked loop (OPLL) transmitter circuitry, as desired. RF front-end circuit 110 may additionally employ a low noise amplifier (LNA) for amplifying an RF signal received at antenna 130 and/or a power amplifier for amplifying a signal to be transmitted from antenna 130. In alternative embodiments, the power amplifier may be provided external to RF front-end circuit 110.

Digital processing circuit 120 may provide a variety of signal processing functions, as desired, including baseband functionality. For example, digital processing circuit 120 may be configured to perform filtering, decimation, modulation, demodulation, coding, decoding, correlation and/or signal scaling. In addition, digital processing circuit 120 may perform other digital processing functions, such as implementation of the communication protocol stack, control of audio testing, and/or control of user I/O operations and applications. To perform such functionality, digital processing circuit 120 may include various specific circuitry, such as a software programmable microcontroller (MCU) and/or digital signal processor (DSP) (not shown), as well as a variety of specific peripheral circuits such as memory controllers, direct memory access (DMA) controllers, hardware accelerators, voice coder-decoders (CODECs), digital audio interfaces (DAIs), UARTs (universal asynchronous receiver transmitters), and user interface circuitry. The choice of digital processing hardware (and firmware/software, if included) depends on the design and performance specifications for a given desired implementation, and may vary from embodiment to embodiment.

In the illustrated embodiment, digital processing circuit 120 includes a carrier-to-interference (C/I) estimation unit 150. As will be described in greater detail below, C/I ratio estimation unit 150 may be implemented as part of various signal-processing blocks such as channel equalization block 205 and channel decoder 206 of FIG. 2, for example. As such, C/I ratio estimation unit 150 may include logic configured to inhibit filtering of instantaneous C/I ratio values to prevent instantaneous C/I ratio values from affecting the C/I ratio estimate during DTX operation. In addition, C/I ratio estimation unit 150 may include a filter that has a variable bandwidth so that during non-DTX reception, the bandwidth of the filter may be adjusted dependent upon the quality of the received signal.

Figure 2:
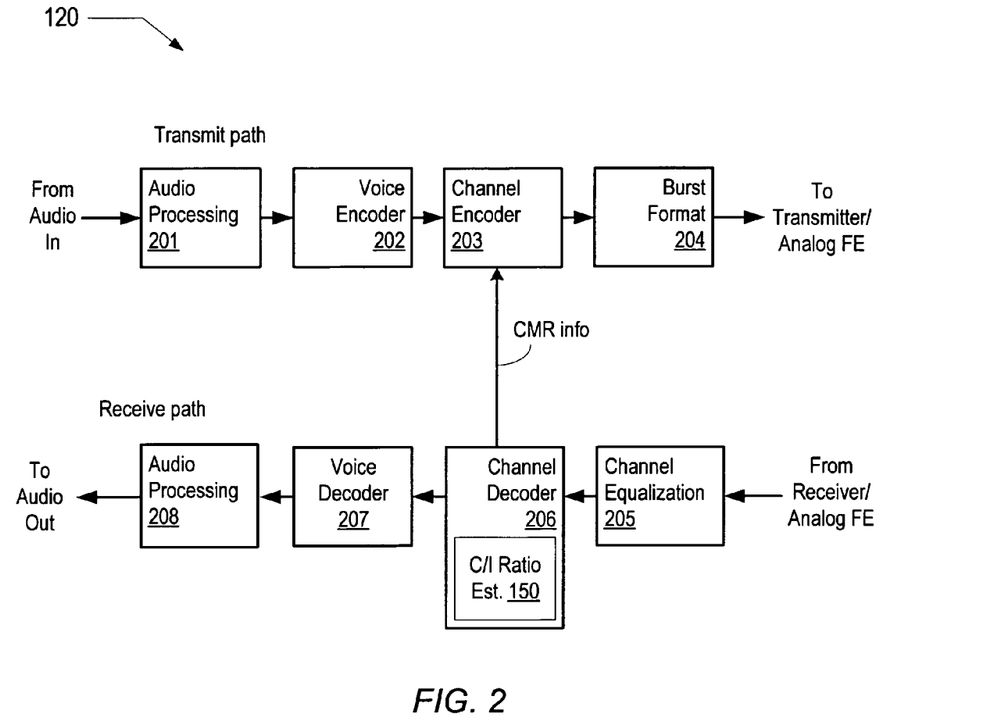
FIG. 2 is a block diagram illustrating specific aspects of one embodiment of the digital processing circuit of FIG. 1.

Referring to FIG. 2, a block diagram illustrating specific aspects of one embodiment of the digital processing circuit of FIG. 1 is shown. Digital processing circuit 120 includes a transmit path and a receive path. The transmit path includes an audio processing block 201 coupled to a voice encoder 202, (also referred to as a speech encoder), which is in turn coupled to a channel encoder 203. Channel encoder 203 is further coupled to a burst format unit 204. The receive path includes a channel equalization block 205 coupled to a channel decoder 206, which is turn coupled to a voice decoder 207. Voice decoder 207 is coupled to audio processing block 208. As shown, portions of channel decoder 206 may embody C/I ratio estimation unit 150. It is noted that other components within digital processing circuit 120 are not shown for simplicity.

Referring collectively to FIG. 1 and FIG. 2, in one embodiment, a user may speak into a microphone, for example to generate analog audio signals. The analog audio signals may be provided to audio processing block 201 where they may be converted into digital audio samples using an analog-to-digital conversion technique. In one embodiment, the digital samples may be formatted into pulse code modulation (PCM) digital audio samples and stored as four, 40-sample signals. The PCM samples may be buffered and then encoded by voice encoder 202. It is noted that digital voice samples having encodings other than PCM may be used in other embodiments, as desired.

Voice encoder 203 may encode the PCM voice samples for later transmission on the air interface using one or more audio compression algorithms. The encoded voice data may subsequently be encoded with error protection bits such as error detection/correction codes (EDC/ECC) by channel encoder 203. In addition, channel encoder 203 may encode non-voice data for transmission upon other channels via the air interface. For example, as described above, in systems that support AMR, a mobile station such as wireless communication system 10 may be configured use a CMR to request the base station use a different voice coder rate on the downlink depending upon the received signal quality. The channel-encoded data blocks may be provided to burst format unit 204 for further preparation for transmission. In various embodiments, burst formatting may include grouping the data block bits into separate burst groups, and appending training sequence bits, and/or other information bits to the new burst group bits. The burst-formatted data may be provided to the RF front end 110 for transmission via the air interface.

In the receive path, analog audio signals may be received via antenna 130. The signals may be amplified, filtered and down converted to one or more intermediate frequencies before being converted to baseband. The channel equalization unit 205 may be configured to use the training sequence bits to isolate the real signal among possibly many signals generated from signals reflections, and the like. Channel equalization block 205 may also be configured to calculate and provide instantaneous C/I ratio values and signal quality measurement values, and to provide channel-encoded data to channel decoder 206. Channel decoder 206 may be configured to remove the error protection bits from the channel-encode data, and to provide voice data to voice decoder 207. In addition, as will be described in greater detail below, C/I ratio estimation logic 150 within channel decoder 206 may be configured to estimate the C/I ratio using a variable bandwidth filter that may filter the instantaneous C/I ratio values that may be provided by channel equalization block 205 dependent on the received signal quality. In one embodiment, C/I ratio estimation logic 150, or portions thereof, may be inhibited from filtering the instantaneous values during DTX mode. Further, C/I ratio estimation logic 150 may be configured to generate CMR request information for the channel encoder 203 in the transmit path dependent on the C/I ratio estimate.

Figure 3:
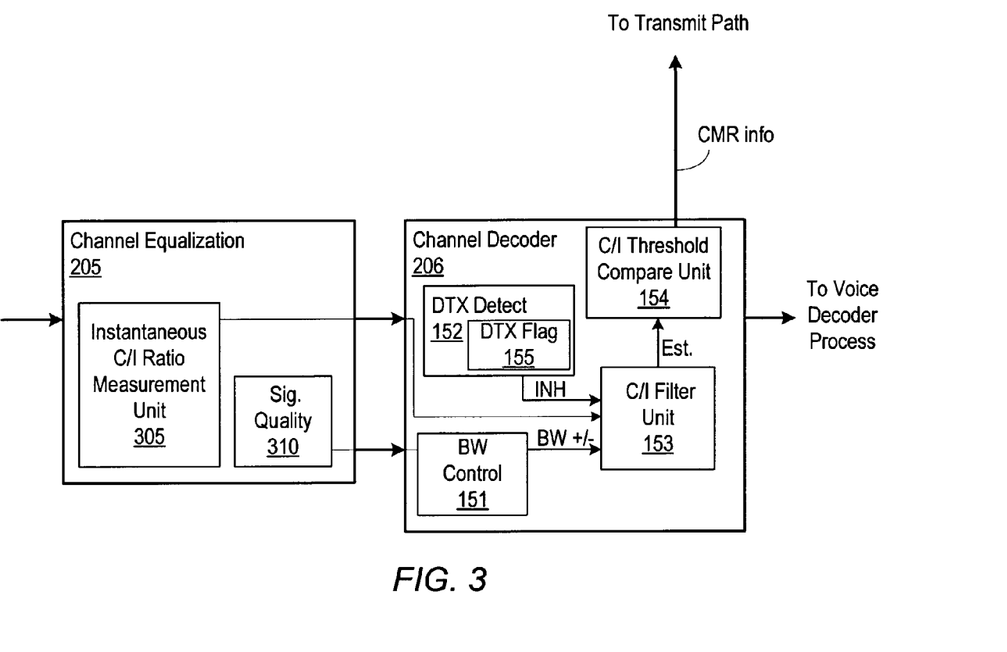
FIG. 3 is a block diagram illustrating more detailed aspects of the embodiment of the digital processing circuit of FIG. 2.

Referring to FIG. 3, a block diagram illustrating more detailed aspects of the receive path of one embodiment of the digital processing circuit of FIG. 1 is shown. Components that correspond to components in FIG. 1 and FIG. 2 are numbered identically for clarity and simplicity. More particularly, in the illustrated embodiment, channel equalization block 205 includes a C/I instantaneous measurement unit 305 and a signal quality unit 310. Channel decoder 206 includes a DTX detection unit 152 and a bandwidth (BW) control unit 151 that are both coupled to C/I filter unit 153. In addition, channel decoder 206 includes a C/I threshold compare unit 154 that is coupled to a C/I filter unit 153. It is noted that C/I ratio estimation logic 150 shown in FIG. 2 may include DTX detection unit 152, bandwidth (BW) control unit 151, C/I filter unit 153, C/I threshold compare unit 154, and DTX flag 155 of FIG. 3.

In one embodiment, C/I instantaneous measurement unit 305 may be configured to continuously measure and calculate instantaneous C/I ratio values, and to provide those values to channel decoder 206. During non-DTX operation, C/I filter unit 153 may be configured to receive the instantaneous C/I ratio values and to generate an estimate based on the instantaneous values (e.g., by filtering the instantaneous values). However, during DTX operation, C/I filter unit 153 may be inhibited from filtering the instantaneous C/I ratio values.

In one embodiment, C/I filter unit 153 may be implemented as a single pole infinite impulse response (IIR) filter. As such, the filter may generate an estimate by averaging based upon the exemplary expression $$y(n)=(1-\alpha)(y(n-1))+x(n)\alpha,$$

where y(n) is the average C/I ratio value or estimate, $\alpha$ is the filter coefficient, x(n) is an instantaneous C/I ratio value, and y(n−1) is the previous average (filtered) C/I ratio value. In this example, the filter coefficient determines the filter bandwidth. As such, increasing or decreasing the filter coefficient either increases or decreases the filter bandwidth. In addition, in this example, if the filter coefficient is made to be one (1), then any new C/I instantaneous value will go to zero and will thus not affect the average estimate value. It is noted that other types of filters may be used.

As described above, when there is no voice data to transmit, for example, due to pauses in normal speech patterns, the transmitter may be turned off (e.g., during DTX operation). To alert the mobile station receiver that the base station transmitter is about to enter DTX operation, in some implementations (e.g., AMR full rate speech), the transmitter may send what is known as a SID_FIRST half-frame, for example. In addition, during DTX operation, the base station transmitter may periodically send SID_UPDATE frames, which may include information that corresponds to comfort noise and may also serve to maintain the radio link during DTX operation. Similarly, at the end of DTX operation the base station transmitter may send an ONSET half-frame to notify a mobile station receiver of the end of the current DTX period. Depending on the implementation, these frames and/or half-frames may include a plurality of bits that serve as identification markers of the start of DTX operation, ongoing DTX operation, and ending of DTX operation, respectively.

In one embodiment, DTX detect unit 152 may be configured to detect the identification markers that correspond to SID_FIRST half-frames, SID_UPDATE frames, and/or ONSET half-frames. Accordingly, DTX detect unit 152 may be configured to distinguish between and detect DTX operation and non-DTX operation, and to provide an inhibit signal to C/I filter unit 153 in response to determining that the transmitter is entering or already in DTX operation. For example, in one embodiment, set DTX flag 155, which may cause the inhibit signal to be provided to C/I filter unit 153. Similarly, DTX detect unit 152 may clear DTX flag 155 to remove or de-assert the inhibit signal in response to detecting an ONSET half frame, or otherwise detecting the ending of DTX operation. Thus, in one implementation, the filter coefficient may be set to one in response to receiving an inhibit signal from DTX detect unit 152. However in other implementations, the inhibit signal may function as a disable or gating signal, which may prevent the filter from receiving the instantaneous values, or may disable the filter from operating on the instantaneous values.

In addition, during receive operation, it is possible for the mobile station receiver to miss one or more of the DTX identification markers such as the ONSET half-frame for example, due to poor signal quality, etc. As such, DTX detect unit 152 may also detect that valid non-DTX data frames have been decoded while in DTX mode. In this case, DTX detect unit 152 may de-assert the inhibit signal thus allowing filtering of the instantaneous C/I ratio values to resume.

In addition to setting the coefficient to one during DTX operation, the filter coefficient may be increased or decreased to different values dependent upon the BW +/− signal provided by BW control unit 151, particularly during non-DTX operation. In one embodiment, signal quality unit 310 may provide a signal quality value to BW control unit 151, which may in turn provide the BW +/− signal to C/I filter unit 153. The BW +/− signal may cause the bandwidth of C/I filter unit 153 to increase or decrease. For example, as signal quality increases, the filter coefficient may be increased thereby increasing the bandwidth of the filter. Conversely, as signal quality decreases, the coefficient may be decreased thereby decreasing the bandwidth of the filter. This functionality may serve to effectively allow the C/I filter unit 153 to average the instantaneous C/I ratio values either faster (wide bandwidth) or slower (narrow bandwidth) when the received signal quality is good or bad, respectively; thereby effecting the average, and thus the C/I ratio estimate less when the signal is of poorer quality. In various embodiments, signal quality unit 310 may be configured to calculate signal quality based on techniques such as soft sum, or bit error counts of the training sequence, among others.

In one embodiment, the C/I ratio estimate may be provided to C/I threshold compare unit 154, which may compare the C/I ratio estimate to one or more threshold values provided by the wireless network. In one implementation, C/I threshold compare unit 154 may include one or more hardware registers or software data structures to store the threshold values. Dependent on whether the C/I ratio estimate value is less than or greater than or equal to a given threshold, C/I threshold compare unit 154 may generate and provide CMR information to channel encoder 203 in the transmit path.

Accordingly, in the embodiments described above, the channel decoder 206 may detect DTX operation and in response, cause the C/I ratio estimate filter 153 to stop averaging new instantaneous C/I ratio values. In addition, the bandwidth of C/I ratio estimate filter 153 may be varied dependent upon the received signal quality.

Figure 4:
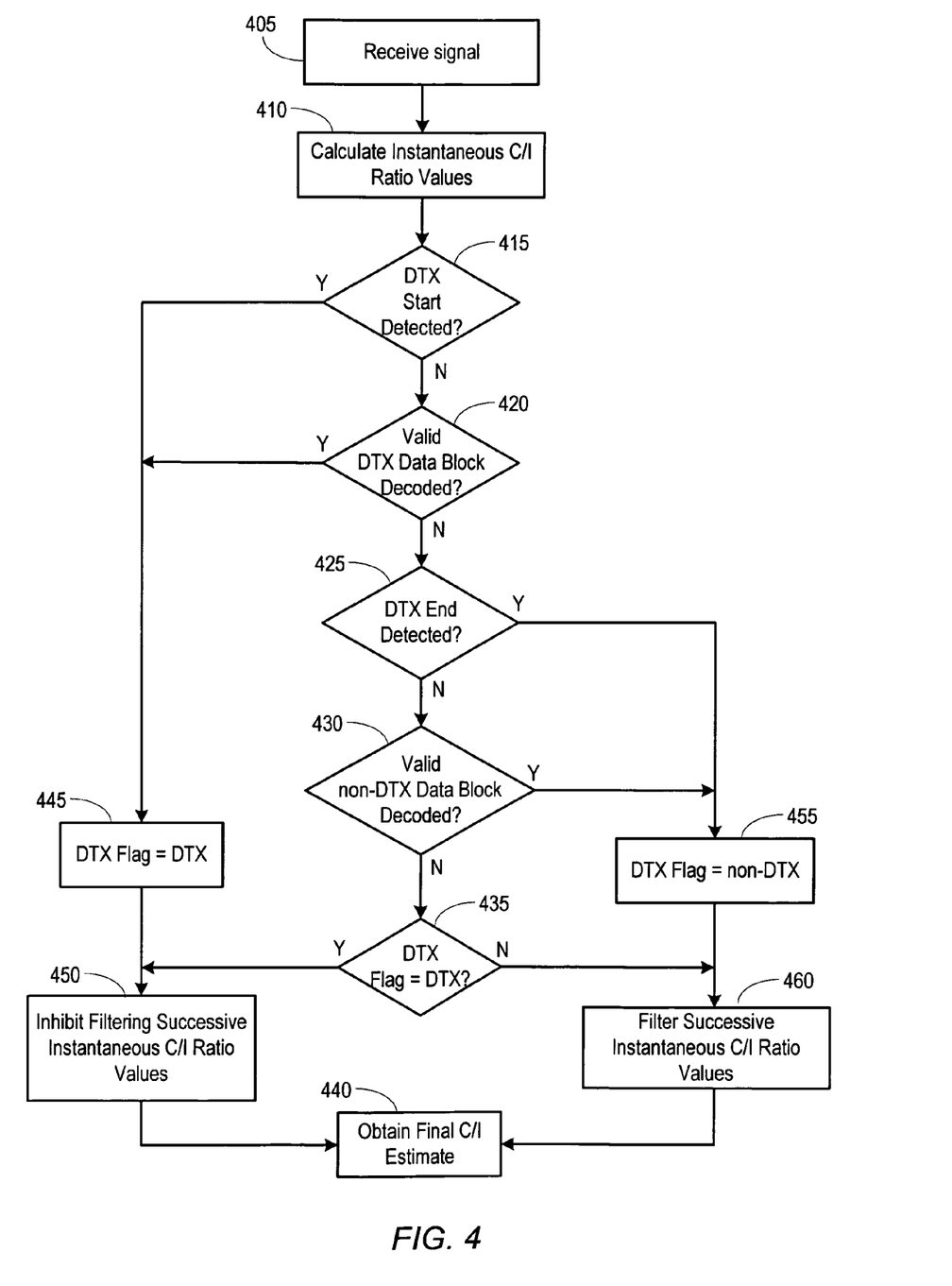
FIG. 4 is a flow diagram describing the operation of the embodiments shown in FIG. 1 through FIG. 3.

FIG. 4 is flow diagram describing the operation of the embodiments shown in FIG. 1 through FIG. 3. Thus, referring collectively to FIG. 1 through FIG. 3, upon receiving the baseband digital audio signal during non-DTX operation (block 405), in one embodiment, channel equalization block 205 may calculate the instantaneous C/I ratio values (block 410). The instantaneous C/I ratio values may be provided to C/I filter unit 153. However, DTX detect unit 152 may continuously monitor and determine whether the transmitter (e.g., a base station) of the signal is entering DTX operation or is in DTX operation to determine whether the instantaneous C/I ratio values should be used in the C/I ratio estimate. In one embodiment, non-DTX operation may be assumed in the absence of some explicit information to the contrary and the DTX flag 155 may be cleared. For example, DTX detect unit 152 may be configured to detect SID_FIRST half-frames which may indicate the start of DTX operation (block 415). However, it is possible that the SID_FIRST marker was missed for various reasons, such as a poor signal. Thus, if the SID_FIRST half-frame is not detected, DTX detect unit 152 may be configured to detect valid DTX data blocks, such as SID_UPDATE frames, which indicate the DTX operation is in-progress (block 420). If the SID_UPDATE frames are not detected, DTX detect unit 152 may be configured to detect the end of DTX mode, by detecting ONSET half-frames, for example (block 425). If ONSET half-frames are not detected, DTX detect unit 152 may be configured to detect the presence of valid non-DTX data blocks (block 430). If DTX detect unit 152 has not detected the presence of valid non-DTX data, the DTX flag 155 may be checked (block 435). If the DTX flag is not indicating DTX mode, the successive instantaneous C/I ratio values may be filtered by the C/I filter unit 153 (block 460) to obtain a final C/I estimate value (block 440).

Referring back to block 415, if DTX detect unit 152 detects the start of DTX operation (e.g., SID_FIRST half-frame is detected), DTX detect unit 152 may set the DTX flag 155 (block 445) to provide an inhibit signal to C/I filter unit 153, which may cause C/I filter unit 153 to stop averaging the successive instantaneous C/I ratio values (block 450). As described above, depending on the specific implementation, the inhibit signal may cause the filter coefficient to be a value of one. Alternatively, the inhibit signal may disable C/I filter unit 153 from performing any filtering, or the inhibit signal may gate the instantaneous C/I ratio values from being provided to the filter, for example.

Once the transmitter is in DTX operation, at predetermined intervals, the transmitter may send SID_UPDATE frames, which may include information that corresponds to comfort noise. Thus, referring back to block 420, if DTX detect unit 152 detects valid DTX data blocks (e.g., SID_UPDATE frame), DTX detect unit 152 may set the DTX flag 155 (block 445) to provide an inhibit signal to C/I filter unit 153 (or keep it asserted), which may cause C/I filter unit 153 to stop averaging the successive instantaneous C/I ratio values (block 450). Thus in this case, the C/I ratio estimate is not affected by the new instantaneous C/I ratio values.

In addition, at the end of DTX operation, the transmitter may send an ONSET half-frame to indicate that DTX operation is ending. As such, referring back to block 425 if DTX detection unit 152 detects the end of DTX operation (e.g., by detecting an ONSET half-frame), DTX detect unit 152 may clear the DTX flag (block 455) to remove or de-assert the inhibit signal thus allowing C/I filter unit 153 to resume filtering the instantaneous C/I ratio values to obtain the C/I ratio estimate as described above in the description of blocks 460 and 440.

However, if DTX detection unit 152 does not detect the ONSET half-frame due to a poor signal, for example (block 425), DTX detection unit 152 may detect that valid non-DTX data bocks (e.g., valid speech frames) are received (block 430). As such, DTX detection unit 152 may determine that DTX operation has ended. Accordingly, DTX detection unit 152 may clear the DTX flag (block 455) to remove or de-assert the inhibit signal thus allowing C/I filter unit 153 to resume filtering the instantaneous C/I ratio values to obtain the C/I ratio estimate as described above in the description of blocks 460 and 440.

Finally, if DTX detect unit 152 has not detected an end to DTX operation (block 425), and DTX detect unit 152 has not detected the presence of valid non-DTX data (block 430), the DTX flag may be checked (block 435). If the DTX flag is indicating DTX mode, DTX detection unit 152 may provide the inhibit signal to C/I filter unit 153 (or keep it asserted), which may cause C/I filter unit 153 to stop averaging the successive instantaneous C/I ratio values (block 450). Thus, the C/I ratio estimate is not affected by the new instantaneous C/I ratio values.

Figure 5:
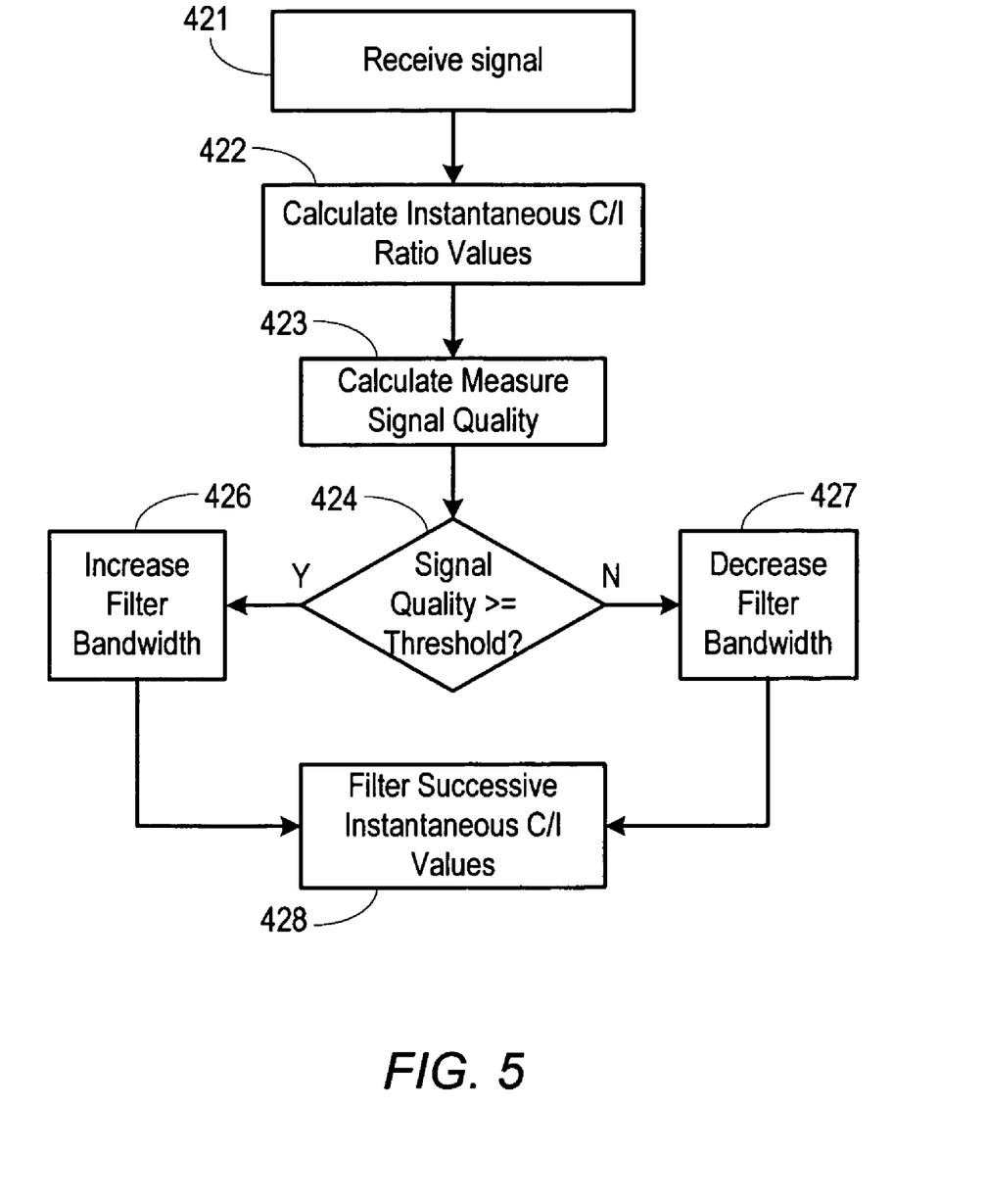
FIG. 5 is a flow diagram describing more detailed aspects of the operation of the embodiments shown in FIG. 1 through FIG. 3.

As described above, C/I filter unit 153 may be a variable bandwidth filter. As such, during non-DTX operation, the bandwidth of the filter may be dynamically adjusted during operation dependent upon the received signal quality. Accordingly, FIG. 5 is a flow diagram that describes the operation of one embodiment of C/I estimation unit 150 during non-DTX operation.

Referring collectively now to FIG. 1 through FIG. 3, and FIG. 5, upon receiving the baseband digital audio signal (block 421), in one embodiment, channel equalization block 205 may calculate the instantaneous C/I ratio values (block 422). The instantaneous C/I ratio values may be provided to C/I filter unit 153.

In addition, the received signal may be provided to signal quality unit 310. In one embodiment, signal quality unit 310 may calculate/measure signal quality using such techniques as soft sum, and bit error rates of the training sequence (block 423). Signal quality unit 310 may provide a signal quality value to BW control unit 151, which may compare the calculated/measured signal quality value to one or more internal threshold values. If the calculated/measured signal quality value is greater than or equal to a given internal threshold value (block 424), BW control unit 151 may provide a signal (e.g., BW +/−) to C/I filter unit 153 to increase the bandwidth of C/I filter unit 153 (block 426). However, if the calculated/measured signal quality is less than the given internal threshold value (block 424), BW control unit 151 may provide the signal to C/I filter unit 153 to decrease the bandwidth of C/I filter unit 153 (block 427). In either case, once the filter bandwidth is configured, instantaneous C/I ratio values may be averaged together by C/I filter unit 153 to generate a C/I ratio estimate (block 428). The process described above may be a continuous process during non-DTX operation.

It is noted that the various components described above may be implemented using hardware circuits, software, or a combination of hardware and software as desired.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless communication apparatus comprising:
a channel equalization unit configured to calculate instantaneous carrier-to-interference (C/I) ratio values of a received signal; and
a C/I ratio estimation unit configured to calculate a C/I ratio estimate by filtering the instantaneous C/I ratio values;
wherein the C/I ratio estimation unit is further configured to inhibit the filtering in response to determining a transmitter of the signal is not transmitting voice data in a voice channel of the signal.

2. The wireless communication apparatus as recited in claim 1, wherein the C/I ratio estimation unit is further configured to determine whether the transmitter of the signal is transmitting voice data in the voice channel of the signal based upon information transmitted in the signal.

3. The wireless communication apparatus as recited in claim 2, further comprising a detection unit configured to detect the information, wherein the information comprises a plurality of bits corresponding to an identification marker that identifies a discontinuous transmission (DTX) mode.

4. The wireless communication apparatus as recited in claim 2, wherein in response to determining the transmitter of the signal is transmitting the voice data, the C/I ratio estimation unit is further configured to resume filtering the instantaneous C/I ratio values.

5. The wireless communication apparatus as recited in claim 1, wherein the C/I ratio estimation unit includes a variable bandwidth filter unit configured to average a plurality of instantaneous C/I ratio values to calculate the C/I ratio estimate, wherein the bandwidth is dependent upon a signal quality of the received signal.

6. The wireless communication apparatus as recited in claim 5, further comprising a signal quality measurement unit coupled to determine the quality of the received signal, and to compare the quality to an internal signal quality threshold.

7. The wireless communication apparatus as recited in claim 6, wherein in response to determining the signal quality is lower than the internal signal quality threshold, the signal quality measurement unit is configured to cause the bandwidth of the variable bandwidth filter to decrease.

8. The wireless communication apparatus as recited in claim 6, wherein in response to determining the signal quality is greater than or equal to the internal signal quality threshold, the signal quality measurement unit is configured to cause the bandwidth of the variable bandwidth filter to increase.

9. A method comprising:
calculating instantaneous carrier-to-interference (C/I) ratio values of a received signal;
filtering the instantaneous C/I ratio values to calculate a C/I ratio estimate;
determining whether a transmitter of the signal is transmitting voice data in a voice channel of the signal; and
inhibiting the filtering in response to determining the transmitter of the signal is not transmitting the voice data.

10. The method as recited in claim 9, further comprising determining whether the transmitter of the signal is transmitting voice data in the voice channel of the signal based upon information transmitted in the signal.

11. The method as recited in claim 10, wherein determining the information comprises detecting a plurality of bits corresponding to an identification marker that identifies a discontinuous transmission (DTX) mode.

12. The method as recited in claim 9, further comprising resuming the filtering the instantaneous C/I ratio values in response to determining the transmitter of the signal is transmitting the voice data.

13. The method as recited in claim 9, wherein filtering ones of the successive instantaneous C/I ratio values to calculate the C/I ratio estimate comprises using a variable bandwidth filter to average the instantaneous C/I ratio values, wherein the bandwidth of the filter is dependent upon a signal quality of the received signal.

14. The method as recited in claim 13, further comprising determining the quality of the received signal, and comparing the quality to an internal signal quality threshold.

15. The method as recited in claim 14, further comprising, during operation, decreasing the bandwidth of the variable bandwidth filter in response to determining the signal quality is lower than the internal signal quality threshold.

16. The method as recited in claim 14, further comprising, during operation, increasing the bandwidth of the variable bandwidth filter in response to determining the signal quality is greater than or equal to the internal signal quality threshold.

17. A wireless telephone comprising:
an analog circuit configured to transmit and receive audio signals;
a digital circuit coupled to the analog circuit and configured to generate and process digital signals corresponding to the audio signals;
wherein the digital circuit includes:
a channel equalization unit configured to calculate instantaneous carrier-to-interference (C/I) ratio values of a received signal;
a C/I ratio estimation unit configured to calculate a C/I ratio estimate by filtering the instantaneous C/I ratio values;
wherein the C/I ratio estimation unit is further configured to inhibit the filtering in response to determining a transmitter of the signal is not transmitting voice data in a voice channel of the signal.

18. The wireless telephone as recited in claim 17, wherein the C/I ratio estimation unit is further configured to determine whether the transmitter of the signal is transmitting voice data in the voice channel of the signal based upon information transmitted in the signal.

19. The wireless telephone as recited in claim 18, further comprising a detection unit configured to detect the information, wherein the information comprises a plurality of bits corresponding to an identification marker that identifies a discontinuous transmission (DTX) mode.

20. The wireless telephone as recited in claim 17, wherein in response to determining the transmitter of the signal is transmitting the voice data, the C/I ratio estimation unit is further configured to resume filtering the instantaneous C/I ratio values.

21. The wireless telephone as recited in claim 17, wherein the C/I ratio estimation unit includes a variable bandwidth filter unit configured to average a plurality of instantaneous C/I ratio values to calculate the C/I ratio estimate, wherein the bandwidth is dependent upon a signal quality of the received signal.

* * * * *

UNITED STATES PATENT AND TRADEMARK OFFICE
CERTIFICATE OF CORRECTION

PATENT NO.       : 7,890,072 B2
APPLICATION NO.  : 11/528073
DATED            : February 15, 2011
INVENTOR(S)      : Shaojie Chen and Guner Arslan It is certified that error appears in the above-identified patent and that said Letters Patent is hereby corrected as shown below:

In the Title, Item 54:

Please change the title to "WIRELESS COMMUNICATION APPARATUS INCLUDING A MECHANISM FOR ESTIMATING CARRIER-TO-INTERFERENCE (C/I) RATIO USING A VARIABLE BANDWIDTH FILTER".

Signed and Sealed this
Twelfth Day of April, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,890,072 B2 | Page 1 of 1 |
| APPLICATION NO. | : 11/528073 | |
| DATED | : February 15, 2011 | |
| INVENTOR(S) | : Shaojie Chen and Guner Arslan | |

It is certified that error appears in the above-identified patent and that said Letters Patent is hereby corrected as shown below:

Title Page, Item 54 and at Column 1, line 1-3,

Please change the title to "WIRELESS COMMUNICATION APPARATUS INCLUDING A MECHANISM FOR ESTIMATING CARRIER-TO-INTERFERENCE (C/I) RATIO USING A VARIABLE BANDWIDTH FILTER".

This certificate supersedes the Certificate of Correction issued April 12, 2011.

Signed and Sealed this
Tenth Day of May, 2011

David J. Kappos
*Director of the United States Patent and Trademark Office*